May 9, 1967 F. KLEIN 3,318,002
DENTAL BURNISHING TOOL
Filed Oct. 22, 1964

INVENTOR.
FRANK KLEIN
BY
ATTORNEY

United States Patent Office 3,318,002
Patented May 9, 1967

1

3,318,002
DENTAL BURNISHING TOOL
Frank Klein, 693 Palisade Road, Union, N.J. 07083
Filed Oct. 22, 1964, Ser. No. 405,682
2 Claims. (Cl. 32—59)

This invention relates to a dental burnishing tool having a series of pins rapidly rotated for the burnishing action.

It is the general object of this invention to provide a tool for burnishing fillings, bridges and other dental work, which may be readily oriented to precise positions desired, in an accurate and reliable manner, without danger of damage to the part to be burnished.

Another object of the invention is to provide a burnishing tool which may be adapted to standard dental rotating flexible shafts, such as are used for general dental work, using interchangeable holders and accessories to couple the tool to the flexible shaft.

A further object of the invention is to provide a highly reliable, long lasting burnishing tool which is precise in operation but rugged and durable in use, will not readily wear and which will give maximum use for a long time.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

Figure 1:
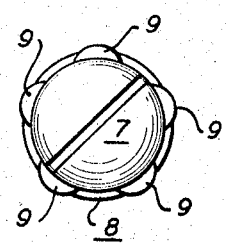
FIG. 1 is a top plan view of a tool embodying the invention.
Figure 3:
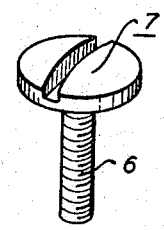
FIG. 3 is an exploded view thereof.

With reference to the illustrative example of the invention in the drawings, the numeral 11 generally indicates motor drive assembly with a flexible shaft F as is conventional in dental equipment and collet 10 for connecting the stem 4 of the burnishing tool thereto. Stem 4 terminates in a threaded plate 5 to receive the shaft 6 of a second plate 7 of the tool, said shaft passing through a pin holder 8 having a plurality of circumferentially opening vertical recesses 14 rotatably receiving the pins 9 therein.

Figure 2:
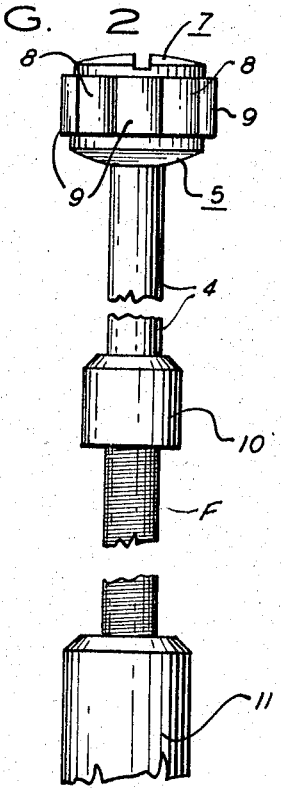
FIG. 2 is a side elevational view thereof.
Figure 2:
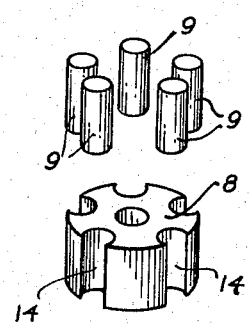
Figure 2:
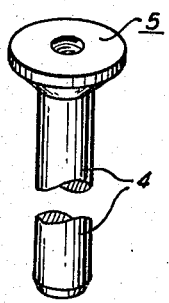

Recesses 14 are formed radially in the holder 8 in spaced relation, preferably extending over 180° in the holder. On assembly of the parts (FIG. 2) pins 9 are

2 disposed intermediate the plates 7 and 5 in the holder 8 and extend circumferentially slightly outwardly of holder 8 sufficiently to provide a smooth burnishing action on rotation of the flexible shaft F.

When the power source is on, the rotating tool is manipulated by the user onto the work to the precise degree desired, selectively bringing to bear all of the pins in holder 8, which may be readily replaced from time to time as desired.

While, in accordance with the patent statutes, best known embodiments have been illustrated and described herein in detail, it is to be understood that the invention is not limited thereto or thereby, the inventive scope being defined in the appended claims.

I claim:

1. A burnishing tool adapted to be secured to a rotatable flexible shaft comprising a pin holder provided with a plurality of recesses axially formed therein communicating with the periphery of the holder, a plurality of pins of substantially the same diameter as the recesses and rotatably positioned in the holder recesses, a first plate positioned against one end of said pin holder having a radial dimension sufficient to provide a bearing surface for one end of each of said pins, a first shaft extending from said first plate and adapted to be connected to the rotatable flexible shaft, and a second plate positioned against the other end of said pin holder having a radial dimension sufficient to provide a bearing surface for the other end of each of said pins, and a second shaft extending from said second plate and engaging said first plate to secure said pin holder and said pins between said plates.

2. A burnishing tool as set forth in claim 1 in which the shaft which extends from the second plate has complementary threaded engagement with the first plate.

References Cited by the Examiner
UNITED STATES PATENTS 1,303,541   5/1919   Curtis _____ 51—206
2,222,774   11/1940  Knowlton _____ 29—90

FOREIGN PATENTS 237,289   10/1925   Great Britain.

RICHARD A. GAUDET, *Primary Examiner.*
J. W. HINEY, *Assistant Examiner.*